United States Patent [19]
Jensen et al.

[11] Patent Number: 5,993,115
[45] Date of Patent: Nov. 30, 1999

[54] PIPELINE TRENCHING AND LAYING DEVICE

[76] Inventors: John Jensen, 155 Oakside Circle SW, Calgary, AB, Canada, T2V 4H3; Eric Jensen, RR1, Bowden, Alberta, Canada

[21] Appl. No.: 08/917,319

[22] Filed: Aug. 25, 1997

[51] Int. Cl.⁶ .................................................. E02F 5/10
[52] U.S. Cl. .......................... 405/177; 405/175; 405/180
[58] Field of Search ............................. 405/174, 175, 405/179, 180, 181, 182, 183, 184, 177

[56] References Cited

U.S. PATENT DOCUMENTS

| | | | |
|---|---|---|---|
| 3,813,888 | 6/1974 | Purviance | 405/180 |
| 4,140,425 | 2/1979 | Flippin | 405/181 |
| 4,260,290 | 4/1981 | Flippin | 405/181 |
| 4,430,022 | 2/1984 | Kinnan | 405/183 |
| 4,655,639 | 4/1987 | Reece | 405/181 |
| 4,736,532 | 4/1988 | Jensen | 37/8 |
| 4,744,696 | 5/1988 | Vidler | 405/180 |
| 4,799,823 | 1/1989 | Williams | 405/180 |
| 4,861,195 | 8/1989 | Hillard | 405/180 |
| 5,281,054 | 1/1994 | O'Riordan | 405/182 |

FOREIGN PATENT DOCUMENTS

| | | | |
|---|---|---|---|
| 1290948 | 4/1988 | Canada | F16L 1/024 |
| 1243694 | 10/1988 | Canada | E02F 3/76 |
| 1268953 | 5/1990 | Canada | . |
| 1318510 | 6/1993 | Canada | E02F 5/10 |
| 1331101 | 8/1994 | Canada | F16L 1/04 |
| 556283 | 9/1943 | United Kingdom | 405/180 |

OTHER PUBLICATIONS

Sauerwein, Stanzet "Big AZ—One of a Kind Plow from Calgary" Apr. 1979, Construction West.

Primary Examiner—Tamara Graysay
Assistant Examiner—Frederick Lagman
Attorney, Agent, or Firm—David S. Thompson

[57] ABSTRACT

A pipeline trenching and laying device is disclosed, having a tractor supported portion, a ripper and a pipe feed chute. The tractor supported portion supports the pipe as it passes over the tractor. A plurality of rollers are spaced and elevated in a manner that carefully controls the curvature of the pipe. A ripper, towed behind the tractor by a rigid fixed connection, cuts a trench. A pipe feed chute is in turn towed by the ripper. The pipe feed chute provides forward and rearward portions separated by an articulating joint. A following roller, having a winch attached, allows pressure to be put on the pipe to cause it to curve in a manner calculated to pass over the tractor supported portion and through the pipe feed chute without bending excessively or kinking.

4 Claims, 9 Drawing Sheets

PIPELINE TRENCHING AND LAYING DEVICE

BACKGROUND

A large number of pipeline trenching and laying devices have been developed, in part a response to the demand for more buried utility lines. However, the economical burying of pipe requires increasingly sophisticated equipment to reduce the labor that would otherwise have to be expended in the effort. Additionally, as the price or real estate rises, the cost of pipeline easements also rises. It therefore becomes increasingly important to be able to utilize narrower easements.

One problem that has been inadequately addressed by previous pipeline trenching and laying devices is the need to support the sidewalls of a trench until the pipe is laid at the bottom of the trench. As a result, most trenches are overly wide; this allows some sidewall collapse to take place without preventing pipe burial at the desired depth. However, by making the trench overly wide, a considerably greater amount of energy is expended. This adds to the time, expense and equipment requirements of the operation.

A further problem that has been inadequately addressed by previous pipeline trenching and laying devices is the need to provide a pipe feed chute that provides the means to control the exact curvature of the pipe as it is laid into the trench. Some curvature is required; however, too great a curvature can result in a kink or a rupture of the pipe. The degree of curvature that a pipe can withstand is a function of many variables, including the diameter of the pipe and the materials used in the construction of the pipe. The amount of curvature required to bury the pipe depends on many variables, including the depth to which the pipe is to be buried. Known pipeline trenching and laying devices have not provided the means to properly control these variable, and therefore control the curvature of a pipe as it is laid in a trench.

A still further problem that has been inadequately addressed by previous pipeline trenching and laying devices is the need to provide a pipe feed chute that is capable of conforming to the sides and bottom of the trench even as the trench is first started, and the plow has not yet achieved its travel depth. The difficulty is related to the changing elevation of the plow as it reaches it cutting depth. Where the pipe feed chute fails to conform to the parameters of the trench cut by the plow, additional friction will result. Previous pipeline trenchers have not disclosed well-developed feed chutes, and structures addressing this issue have generally been missing.

What is needed is a pipeline trenching and laying apparatus that can control the curvature of the pipe, taking into account the pipe's diameter, materials of construction and the depth of the trench. The apparatus must also provide structures that minimize the width of the required trench, and that prevent sidewall collapse. The apparatus must provide a well-developed feed chute that adapts to changes in the elevation of the trench floor. Such an apparatus would be a considerable advance in the field of pipeline trenching and laying devices.

SUMMARY

The present invention is directed to an apparatus that satisfies the above needs. A novel pipeline trenching and laying device, for attachment to a tractor, is provided that includes some or all of the following structures.

(A) A tractor supported portion, typically carried on the top of a tractor, in turn carries a pipe, previously laid out on the ground in front of the tractor, up and over the tractor. In a preferred embodiment, the tractor supported portion provides seven roller assemblies of varying elevations to gently curve the pipe as it is lifted over the tractor, thereby preventing kinks or bends. The tractor support portion may provide:

(a) An approximately 10 meter long rail base, attachable to an upper portion of the tractor, includes parallel rails separated by about 3 feet. A number of vertical supports extend upwardly from the rail base, some of which are connected by horizontal supports and cross-members.

(b) A first roller assembly, carried by vertical supports extending from the rail base, provides an upper hold-down roller and a lower support roller. The upper hold-down roller is supported by an articulating upper support bracket that allows the upper hold-down roller to be swung away, the pipe positioned, and the upper hold-down roller swung back into place.

(c) A number of additional roller assemblies, typically six, are also carried by the rail base, each positioned an exact distance from the rail base, to maintain the curvature of the pipe within tolerances.

(B) A ripper, attached to the tractor by a rigid fixed connection, is a plow suitable for cutting a narrow trench up to about 2 meters deep.

(C) A pipe feed chute, attached to the ripper by an adjustable tow assembly, may include some or all of the following:

(a) A pair of parallel planar sidewalls are in a preferred embodiment clad in stainless steel to reduce friction. The sidewalls are joined by a bottom portion, each sidewall supporting angle iron rails on the upper lengthwise edge.

(b) At least one chute buckle, attached to an upper portion of each of the parallel planar sidewalls, keeps the sidewalls attached together, yet separated by a distance of approximately 0.3 meters.

(c) An triangular nose, attached to the parallel planar sidewalls, typically having at least one stiffener plate and a forwardly directed ear defining an attachment opening for attachment to the adjustable tow assembly.

(d) An articulating joint includes inner and outer overlapping panels carried by the sidewalls and a hinge, carried by the bottom portion, which allows a forward portion of the pipe feed chute to pivot with respect to a rearward portion of the pipe feed chute. In the typical embodiment, where the chute is approximately 30 feet long, the articulating joint allows some pivoting between the two 15 foot sections.

(e) A front guide roller assembly guides the pipe into the pipe feed chute. The front guide roller assembly is carried by the parallel planar sidewalls, and provides two rollers having vertical axes and a single roller having a horizontal axis.

(f) A following roller assembly, provides a frame body supporting a roller within the frame. A winch, connected to the frame body, or similar device for biasing the roller, allows adjustable tension to be applied to the pipe, thereby controlling the curvature of the pipe. The pipe is thereby held in place, and, in part due to the low center of gravity of the apparatus, the following roller is prevented from inadvertently falling off.

It is a primary advantage of the present invention to provide a novel pipeline trenching and laying device that provides a pipe feed chute that minimizes the width of the trench produced, thereby speeding the process, reducing damage to the ground and minimizing the power required to plow the trench.

Another advantage of the present invention is to provide a novel pipeline trenching and laying device that carefully controls the curvature of the pipe as it is laid, thereby protecting the pipe from damage.

A still further advantage of the present invention is to provide a novel pipeline trenching and laying device that provides an articulated pipe feed chute that adjusts to accommodate changes in the elevation of the ground as well as changes in the elevation of the trench, particularly as the trench is first started, and its full depth is not yet achieved.

DRAWINGS

These and other features, aspects, and advantages of the present invention will become better understood with regard to the following description, appended claims, and accompanying drawings where:

DESCRIPTION

Figure 1:
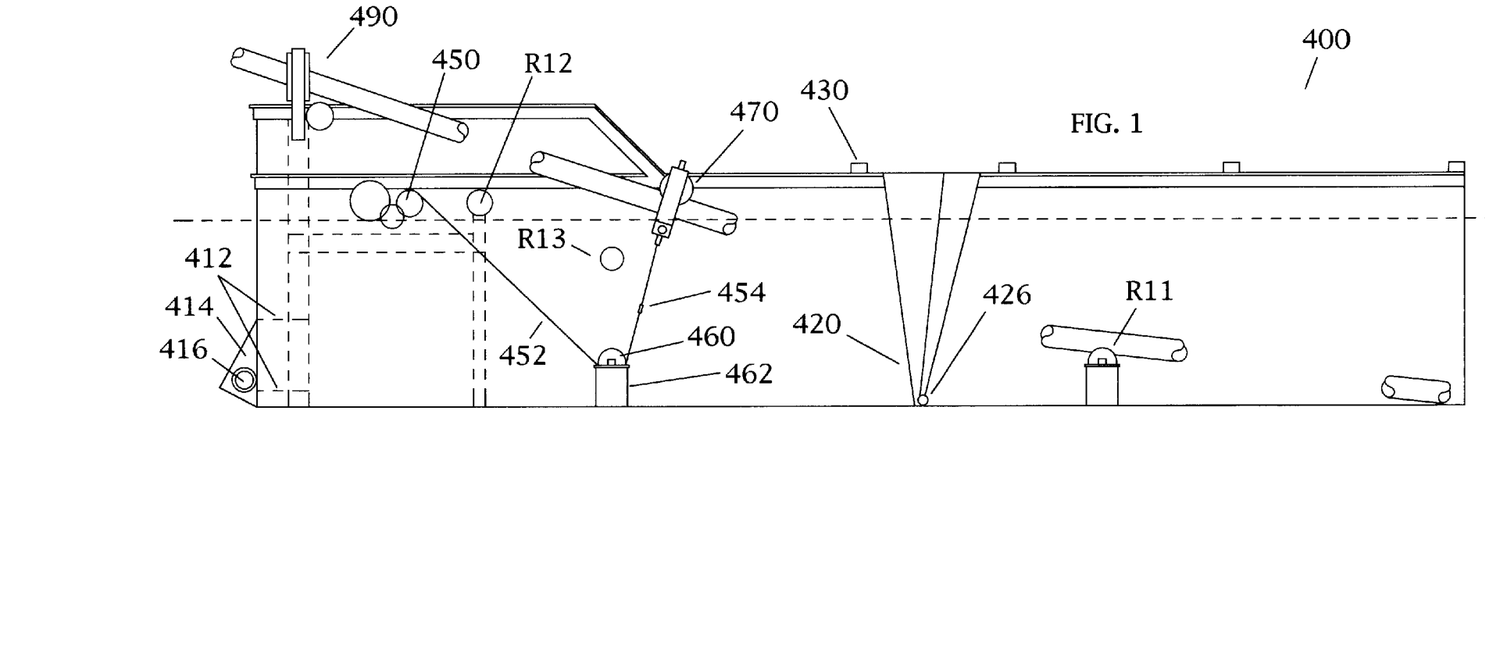
FIG. 1 is a side cross-sectional view of the pipe feed chute of a version of the invention.
Figures 4, 5:
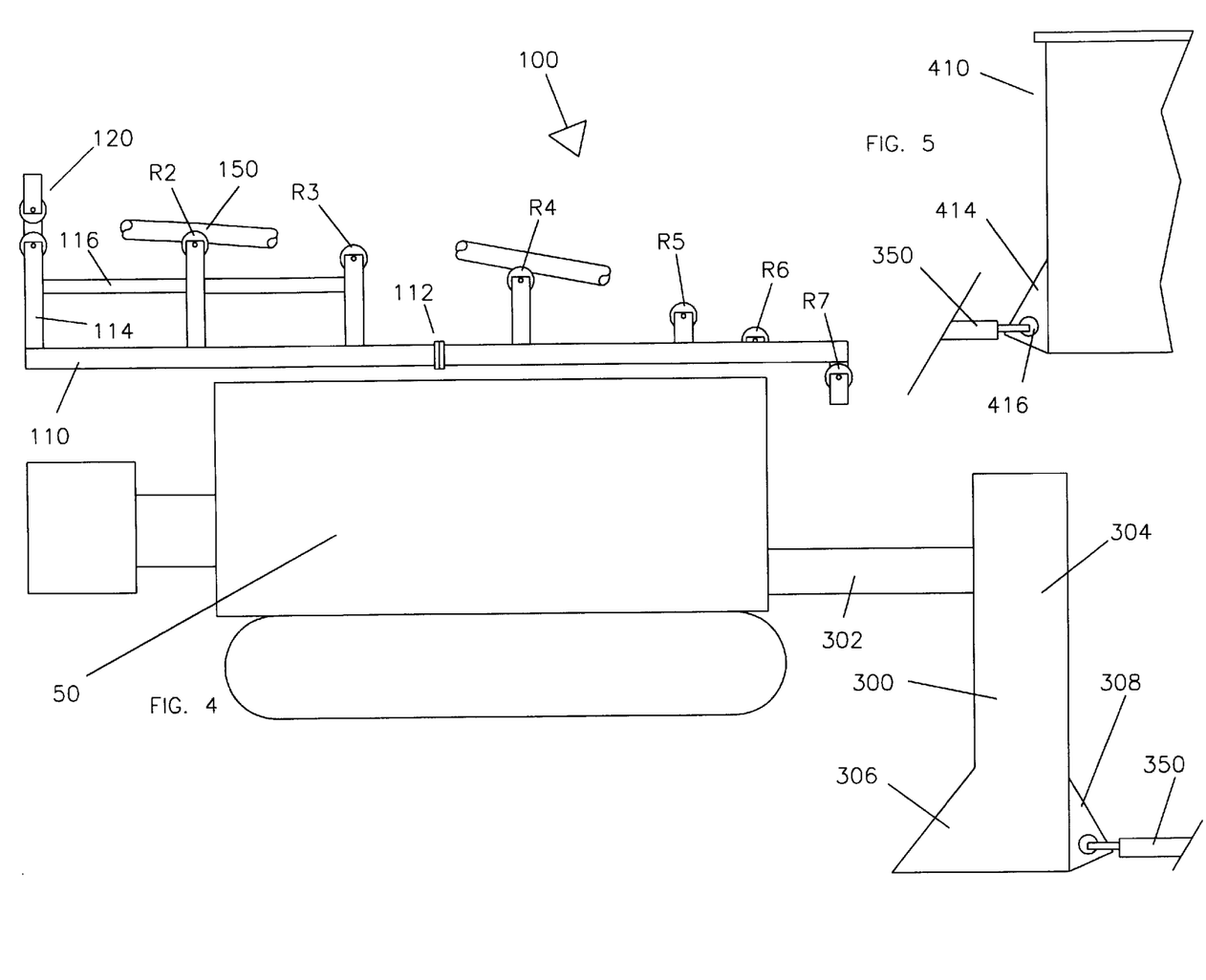
FIG. 4 is a side view of the tractor supported portion and the ripper of a version of the invention.
FIG. 5 is a side view of the ripper portion of a version of the invention.

Referring generally to FIGS. 1 and 4, a pipeline trenching and laying device constructed in accordance with the principles of the invention is seen. The pipeline trenching and laying device of the invention, utilizing known types of tractors buries known types of pipe. The pipeline trenching and laying device provides a tractor supported portion 100, a ripper 300 carried in a rigid manner behind the tractor, and a pipe feed chute 400 towed behind the ripper. A plurality of rollers carried by the tractor supported portion 100 support the pipe in a gently curving manner. The ripper 300 plows a narrow trench up to 2 meters in depth. The pipe feed chute 400 follows the ripper through the trench, with only a portion of its assembly above ground. In operation, a pipe 60 is laid on the ground with all segments fully welded or otherwise connected. A portion of the pipe is then carried above a tractor 50 by the tractor portion 100, as seen in FIG. 4. The pipe passes over the ripper 300, and into the pipe feed chute 400. Within the pipe feed chute, a plurality of rollers, including a follower roller with its tension controlled by a winch, control the curvature of the pipe as it is moved to the bottom of the trench.

Referring in particular to FIG. 4, and to the detailed views of FIGS. 5–8, the tractor supported portion 100 of the invention may be understood. The tractor supported portion is carried by the roof or roll cage of a tractor in a manner that may be determined by the structure of the individual tractor to be used. The tractor supported portion provides a rail base 110 that is attached to an upper portion of the tractor 50. The rail base provides two parallel square steel tubing rails having outside edges that are 0.963 meters apart and centers that are 0.760 meters apart. In the preferred version of the invention, the rail base is 7.927 meters in length and is made of 8 WF 35 steel beam. Optionally, two or more beam segments may be linked together by bolt connectors 112 or similar fastening means to form the rail base.

Five pairs of vertical supports 114 extend upwardly from the parallel rails of the rail base 110, and are best seen in FIG. 4. The vertical supports are made from square tubing having a 127 mm side, or similar material. The distance between the vertical supports, and the height of each vertical support, are both factors that are important to control the exact curvature of the pipe 60. The distance between supports and the height of each support must be chosen with respect to the material used to construct the pipe, the diameter of the pipe and other factors such as the thickness of the pipe wall. In the preferred version of the invention, the distance between the first vertical support (left-most in FIG. 4) and the second vertical support is 1.585 meters (center to center). The distance between the second and third vertical supports is 1.578 meters; the distance between the third and fourth is 1.567 meters; the distance between the fourth and fifth is 1.547 meters; the distance between rollers R5 and R6 is 0.765 meters; and the distance between rollers R6 and R7 is 0.758 meters.

The first vertical support has a height sufficient to carry the roller assembly 120 at an elevation where the center of the pipe is 1.235 meters above the rail base 110. The second vertical support has a height sufficient to carry the roller R2 at an elevation where the center of the pipe is 1.187 meters above the rail; the third vertical support carries roller R3 1.036 meters above the rail base; the fourth vertical support carries roller R4 0.790 meters above the rail base; and the fifth vertical support carries roller R5 so that the center of the pipe is 0.441 meters above the rail base. Roller R6 is carried by the rail base directly, and supports the center of the pipe 0.233 meters above the rail base. Roller R7 is supported below the rail base, as will be seen.

As seen in FIG. 4, horizontal supports 116 add strength to the first three taller vertical supports.

Figure 6:
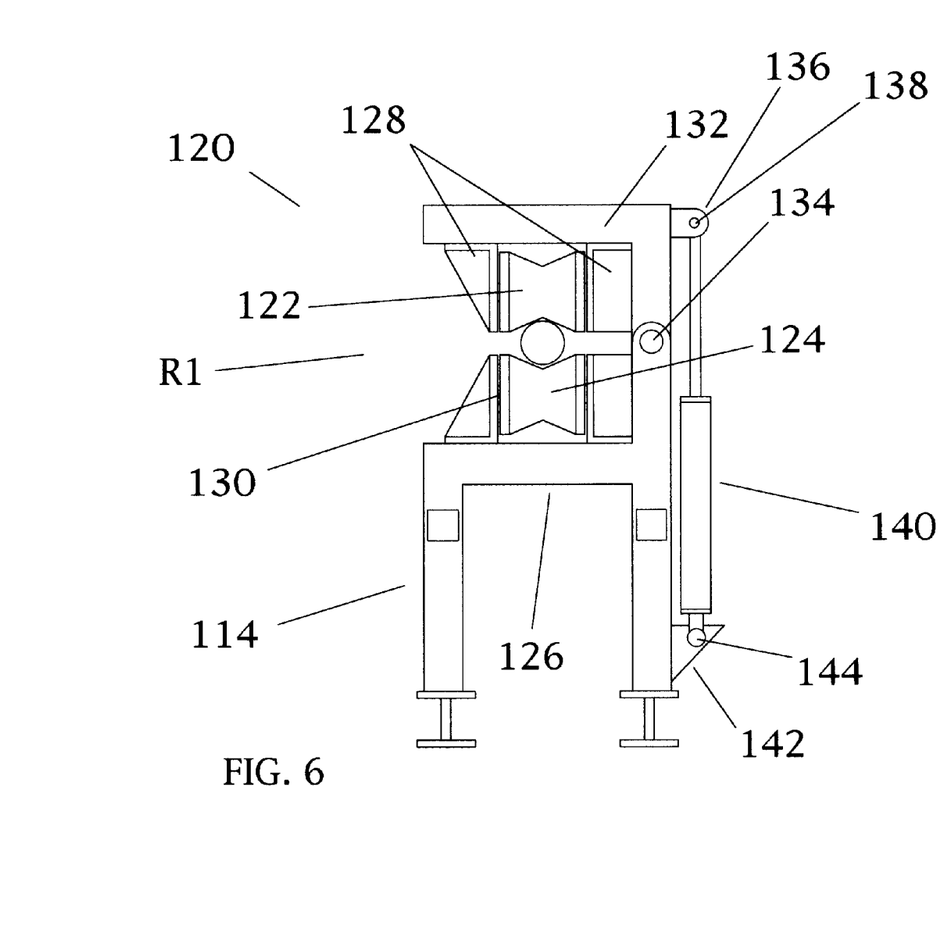
FIG. 6 is a front view of a version of the roller set 1, carried by the tractor supported portion seen in FIG. 4.
Figure 6A:
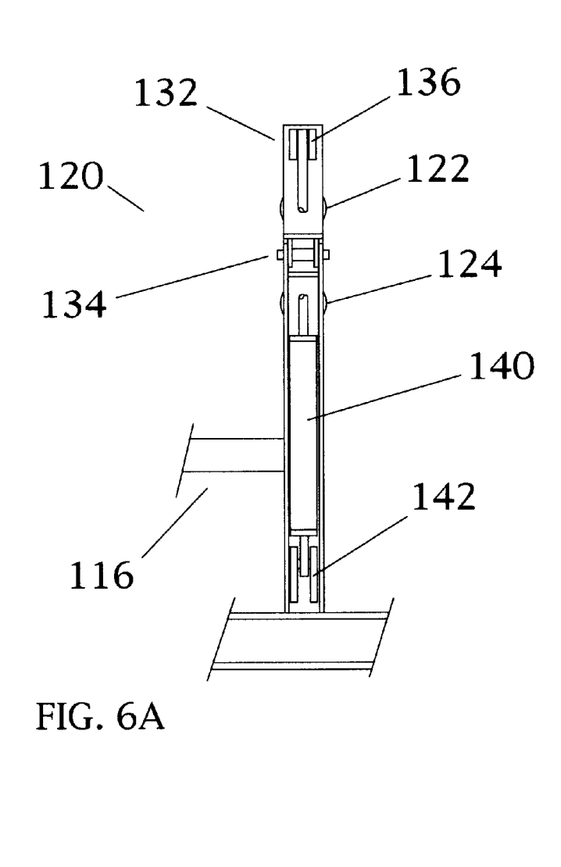
FIG. 6A is a side view of a version of the roller set 1 of FIG. 6.

Referring in particular to FIG. 6, the structure of the first roller assembly 120, carrying roller set R1 may be understood. The first roller assembly carries a roller set R1 including an upper hold-down roller 122 and a lower support roller 124. A cross member 126, connects the upper portions of the first pair of vertical supports. Mounting brackets 128 are carried by the cross member 126 and support an axle 130 carrying the lower support roller 124.

An articulating upper support bracket 132 is carried by pivot 138, and supports the upper hold-down roller 122 by means of additional mounting brackets 128. The articulating upper support bracket carries an upper attachment ear 136 having a pivot 134. An hydraulic cylinder 140 is carried at an upper portion by the pivot 134 and at a lower portion by a pivot 144 defined in a lower attachment ear 142 carried by the first vertical support 114. The hydraulic cylinder allows the articulating upper support bracket 132 to be rotated to allow positioning of the pipe on the lower support roller 124. The hydraulic cylinder 140 then biases the articulating upper support bracket into the closed position, wherein the pipe 60 is caught between the upper and lower rollers 122, 124.

Figures 7, 7A:
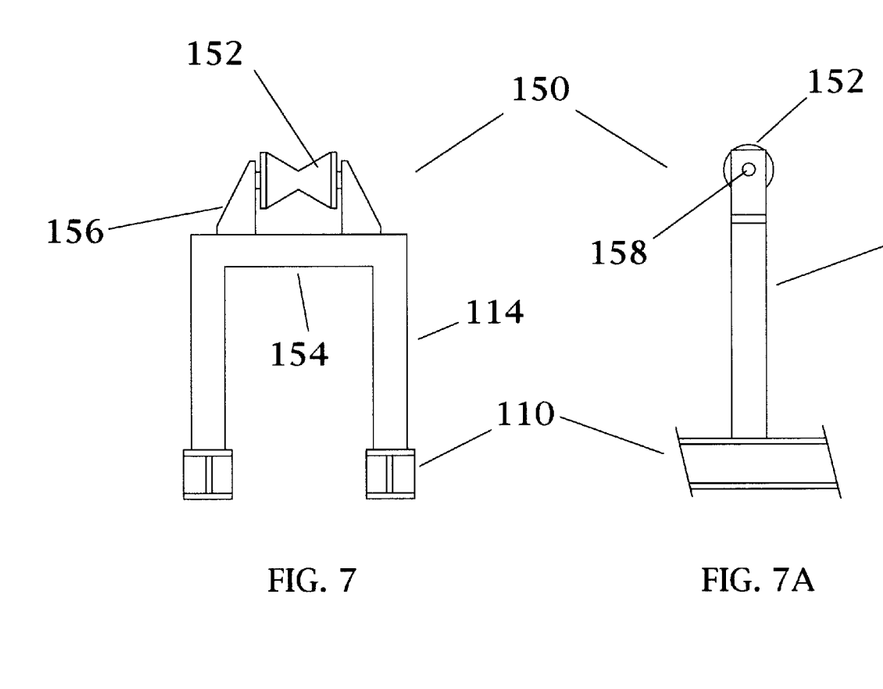
FIG. 7 is a front view of a version of the rollers 2–5, carried by the tractor supported portion seen in FIG. 4.
FIG. 7A is a side view of a the rollers of FIG. 7.

Referring to FIG. 4 and in particular to the detail of FIGS. 7–7A, the structure of similar roller assemblies 150 may be understood. While the structure of the roller assemblies is similar, the use of distinct reference designator R2–R5 indicates that each roller R2–R5 is distinct by virtue of its position along the rail base and the height of the pair of associated vertical supports. A cross member 154 carries a pair of mounting brackets 156, which in turn carry a roller 152 by means of an axle 158.

Roller R6, seen in FIG. 4, is supported by the pair of rails forming the rail base 110. The center of the pipe 60, as supported by roller R6, is typically 0.233 meters. Roller R6 and all other rollers herein described are typically 0.203 meters in diameter at the widest and 0.320 in length.

Figure 8:
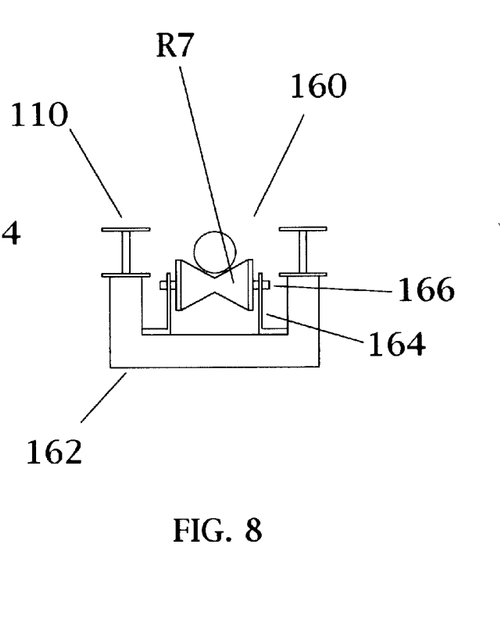
FIG. 8 is a front view of a version of roller 7, carried by the tractor supported portion seen in FIG. 4.

Referring to FIG. 4, and in particular to the detail of FIG. 8, the seventh roller assembly 160 supports the pipe 60 between the rails forming the rail base 110. A support bracket 162, supported below the rail base, is typically made of 127 mm square tubing. The mounting bracket supports two mounting brackets 164 which carry the roller R7 by means of an axle 166.

A ripper 300 is towed behind the tractor by a rigid fixed connection 302 or similar towing connection. The ripper provides an upright body 304 and a forwardly directed wedge-shaped plow 306. A rearwardly directed tow-assembly attachment ear 308 allows the adjustable tow assembly 350. The ripper 300 should be sized to allow a trench to be cut having a depth of up to 2 meters. The overall height of the ripper is typically 3 meters or less. The width of the ripper is consistent with the need to cut a trench that will allow the 0.305 meter wide pipe feed chute follow.

An adjustable tow assembly, best seen in FIG. 5, connects a fastening point defined in the ear 308 of the ripper 300 to a similar fastening point 416 defined in a forwardly directed ear 414 of the triangular nose 410 of the pipe feed chute 400. The tow assembly is adjustable in length, but is typically less than 3 meters.

Figure 2:
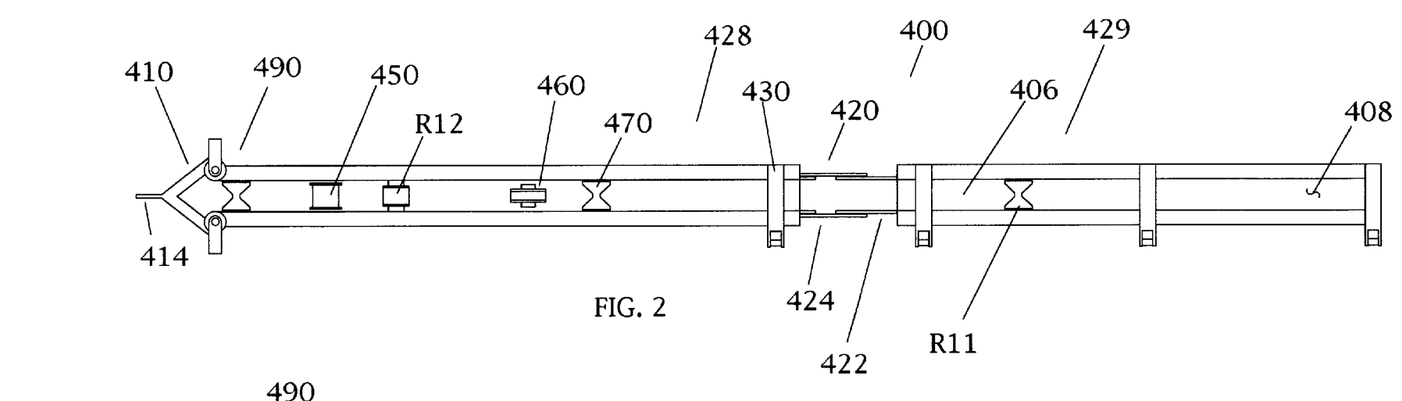
FIG. 2 is a top view of the pipe feed chute of FIG. 1.

A pipe feed chute 400 is a narrow, elongate structure which follows the ripper through the trench. The overall length of the pipe feed chute is typically 10 meters, while the width is typically 0.305 meters. The length of the pipe feed chute is closely related to the length over which a pipe must be bent to prevent damage to the pipe, while still allowing the pipe to be lowered into the trench. The pipe feed chute provides parallel sheet steel sidewalls 402, 403 having a thickness of 12.7 mm. In a preferred version of the invention, the sidewalls are clad in stainless steel. Stainless steel reduces the friction between the pipe feed chute and the surrounding ground. Upper angle iron rails 404, have 76.2 mm sides and are carried by an upper portion of the sidewalls to provide greater strength. A bottom panel 406 is constructed similarly to the sidewalls. As seen in the top view of FIG. 2, a preferred version of the pipe feed chute provides a 1.6 meter long opening 408 defined in the bottom 406, which lets the chute bottom pass the pipe without contact as the pipe comes to lie on the ground at the trench bottom.

Figure 15:
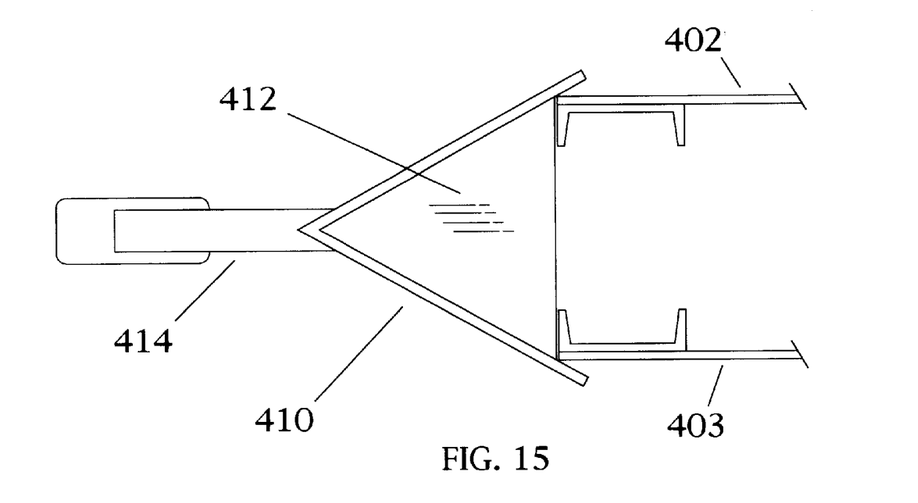
FIG. 15 is an enlarged top view of the front of the pipe feed chute.

As seen in particular in the enlarged view of FIG. 15, the pipe feed chute 400 has an triangular nose 410 that carries a forwardly directed ear 414 defining an attachment point opening 416 to which the rearward portion of the adjustable tow assembly 350 is attached. In the preferred embodiment, two stiffener plates 412 are horizontally oriented plates attached to both angled sides of the triangular nose 410. The stiffener plates reinforces the triangular nose 410 in the area of the ear 414, where considerable forces are present.

Figure 13:
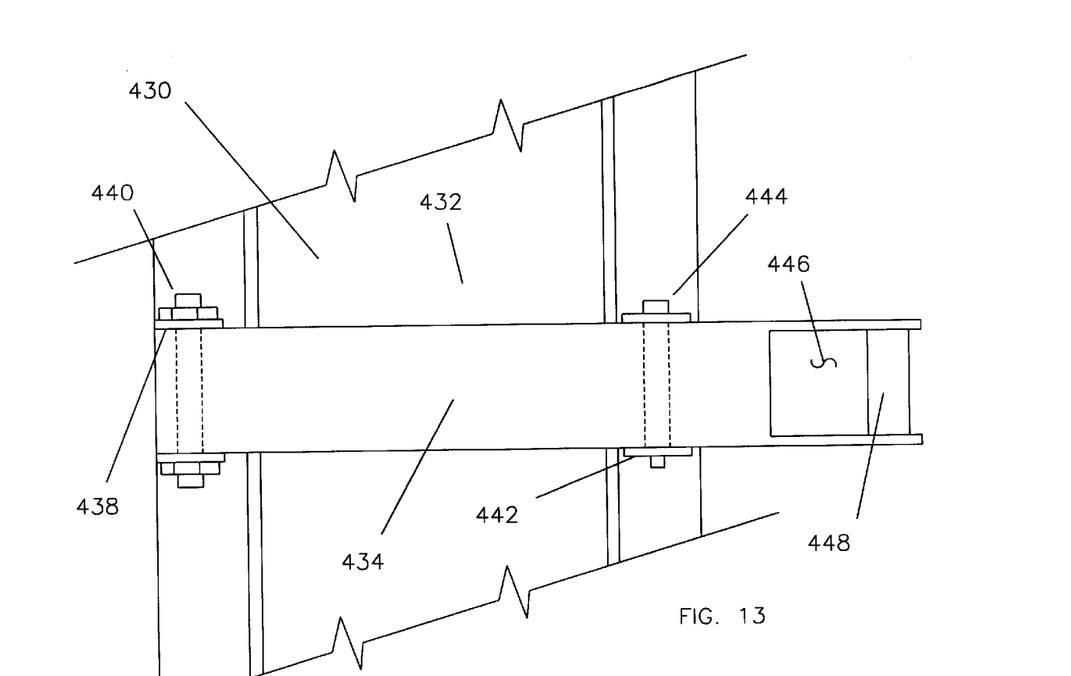
FIG. 13 is a detailed top view of the chute buckle seen in FIG. 1.
Figure 14:
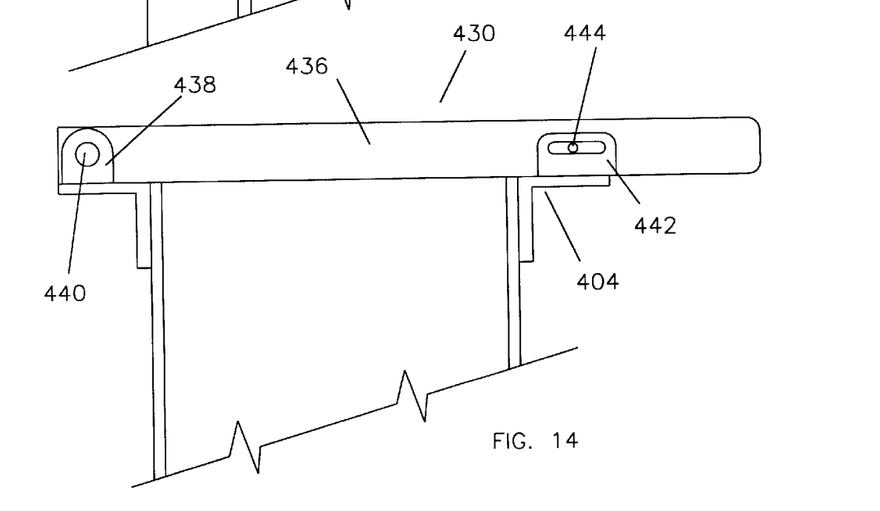
FIG. 14 is a detailed side view of the chute buckle of FIG. 13.

In the preferred embodiment, four chute buckles 430 fasten the top portions of the two parallel sidewalls 402, 403 together, and keep them a fixed distance apart. Each chute buckle provides a body portion 432 that is oriented perpendicularly to the sidewalls. The body portion is formed from a sheet metal top 434 having opposed side rails 436. A pivot bracket 438 having a fixed pin 440 allows the body portion to be rotated with respect to a first sidewall 402. A locking bracket 442 is carried by an angle iron rail 404 and defines an elongate slot carrying a removable pin 444. The locking bracket 442 allows the body portion to be locked into place with respect to a second sidewall 403. The side rails 436 extend further than the top 434, defining an opening 446, and carrying a handle 448. The handle allows the buckles to be fastened and unfastened conveniently.

An articulating joint 420, seen in the side view of FIG. 1, allows the pipe feed chute 400 to bend up to 7.5 degrees, either up or down. This is advantageous when the trench is being started or finished; the pipe feed chute bends to accommodate the changing elevation of the bottom of the trench. For example, where the trench is being started, the forward part of the pipe feed chute may tilt downwardly, while the rear portion is horizontal. Similarly, where the trench is being terminated, the forward part of the pipe feed chute may tilt upwardly, while the rear portion is still horizontal. This design significantly reduces the friction associated with moving the pipe feed chute through a trench.

The articulating joint provides inner and outer overlapping panels 422, 424. A bottom piano type hinge 426 joins the forward and rearward sections 428, 429 of the pipe feed chute together. In a preferred embodiment, the forward and rearward sections of the pipe feed chute are both 5 meters long.

Figure 9:
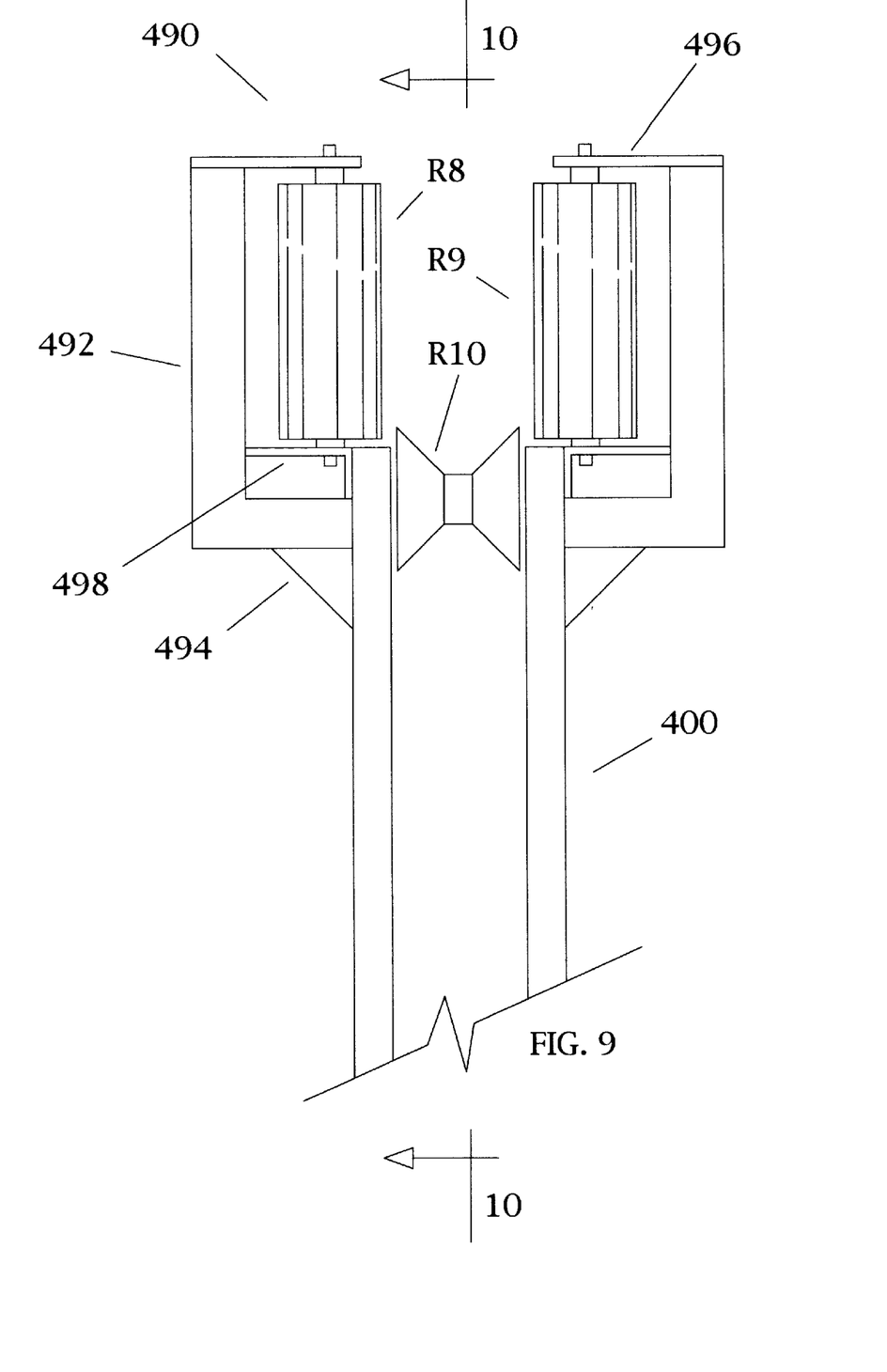
FIG. 9 is a front view the front guide roller assembly, including of rollers 8–10, carried by the pipe feed chute of FIG. 1.
Figure 10:
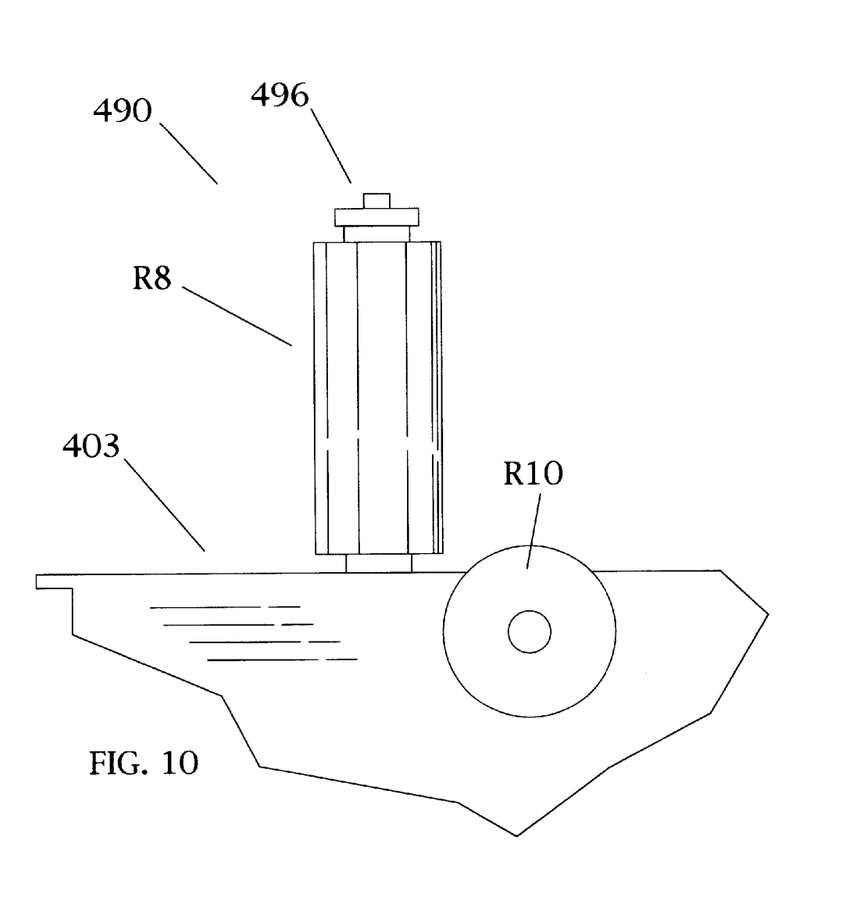
FIG. 10 is a side view of the roller assembly of FIG. 9.

Referring to FIG. 1 and the detail of FIGS. 9 and 10, a front roller assembly 490 may be seen. The front guide roller assembly receives the pipe 60 from the seventh roller assembly 160 carried by the tractor supported portion 100, and provides two rollers having vertical axes, R8, R9, and one roller having a horizontal axis, R10.

Referring in particular to the front view of FIG. 9 and the side view of FIG. 10, two L-shaped side arms 492 are supported by the sidewalls 402, 403. A reinforcing wedge 494 holds each side arm in place. A top mounting bracket 496 and an L-shaped bottom mounting bracket 498 support the vertically oriented rollers R8 and R9. Horizontally oriented R10 is supported by an axle carried by the opposed sidewalls 402, 403.

In an alternative embodiment to that seen in FIGS. 9 and 10, four rollers may be used in the front roller assembly 490. These rollers may be arrayed left, right, top and bottom, as seen in FIG. 9, but with the addition of an upper roller. In a still further alternative, the four rollers may be oriented in a lower V-orientation and an upper inverted V-orientation, wherein the rollers would all be oriented at 45 degrees to horizontal and vertical.

Pipe drop protection rollers R12 and R13 are similarly carried by axles supported by the sidewalls 402, 403. The pipe drop protection rollers R12, R13 support the pipe 60 in the event that the pipe's curvature becomes too great. In this event, the pipe drop protection rollers would prevent the pipe from rupturing or developing a kink.

A support roller R11 is mounted on the bottom 406 of the rear portion of the pipe feed chute 400. The support roller R11 supports the bottom of the pipe, and together with the other rollers, controls the curvature of the pipe as it extends through the pipe feed chute.

Figures 3, 12:
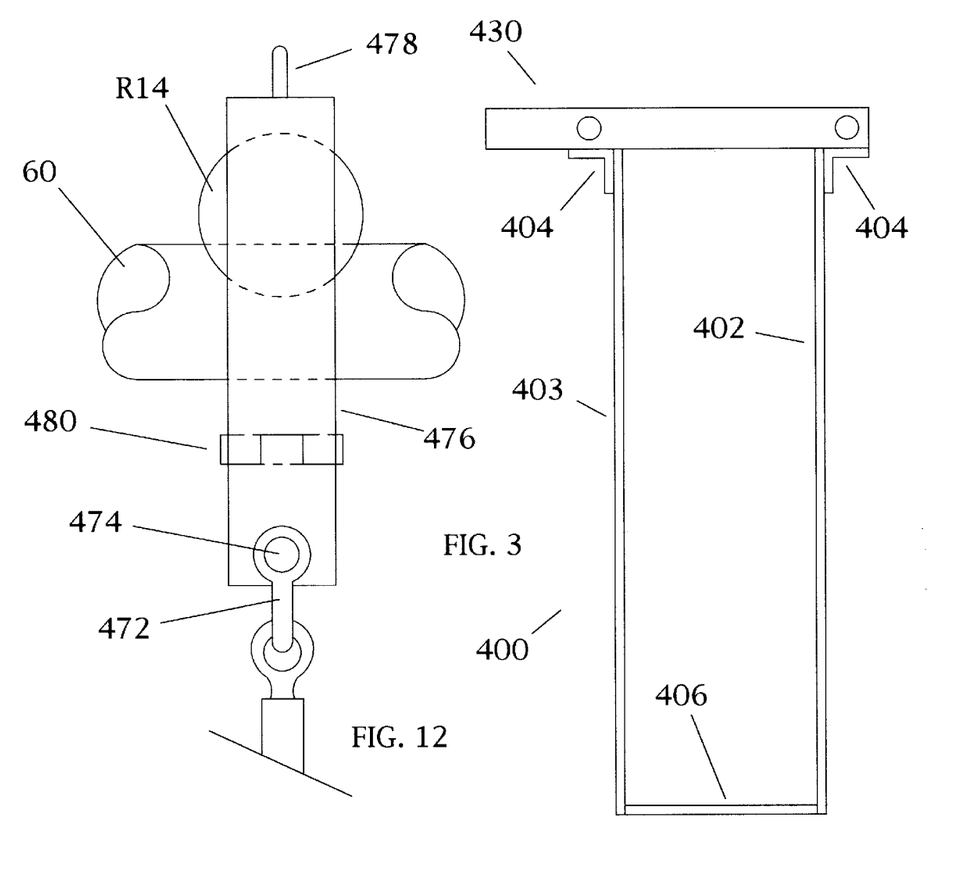
FIG. 3 is a cross-section of the pipe feed chute, along the 3—3 lines seen in FIG. 1.
FIG. 12 is a detailed side view of the following roller of FIG. 11.
Figure 11:
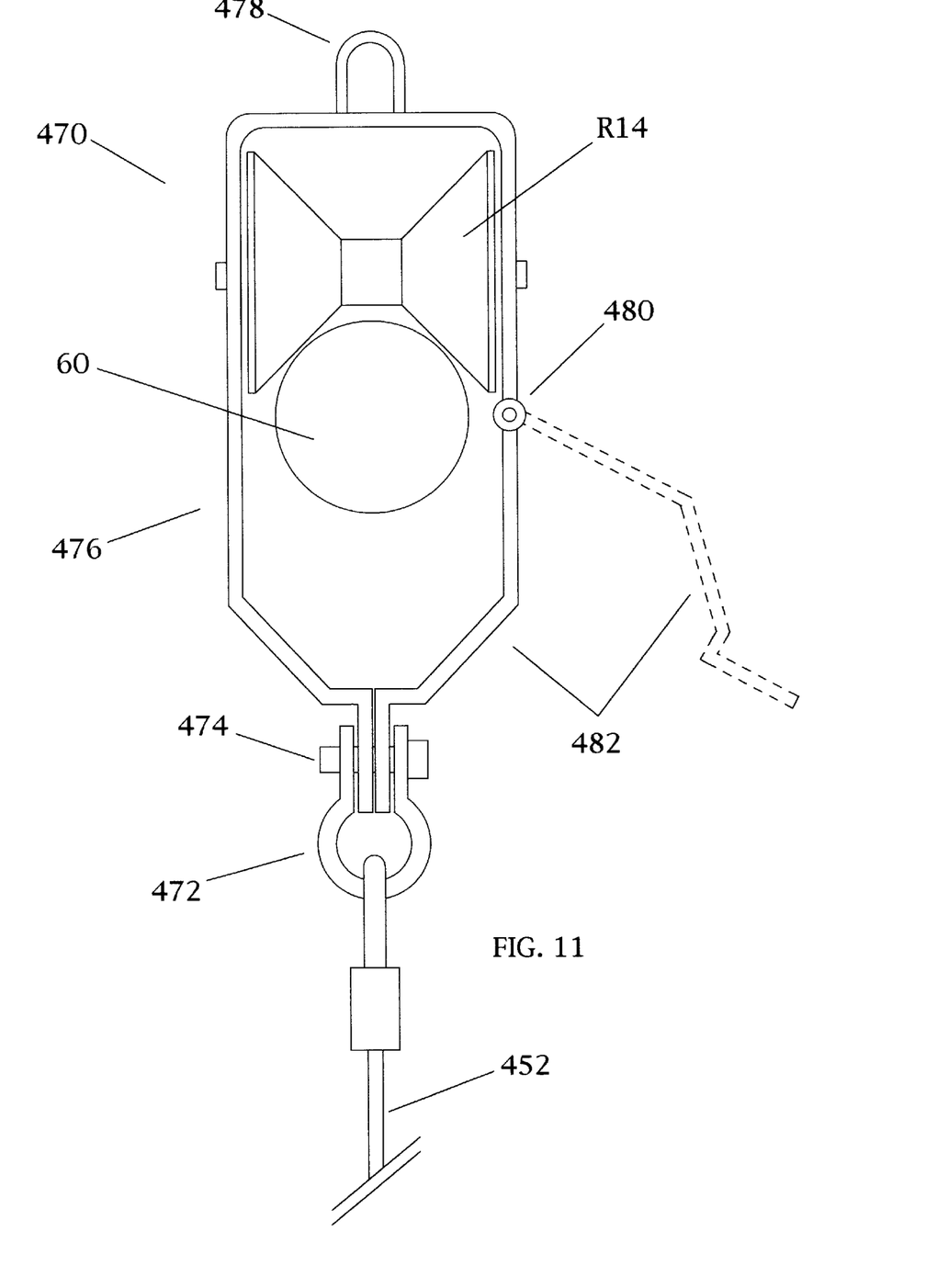
FIG. 11 is a detailed front view of the following roller seen in FIG. 1.

A following roller assembly 470 is seen in FIGS. 4, 11 and 12. The following roller allows an adjustable downward force to be placed on the pipe by means of winch 450, as will be further described. This force allows the curvature of the pipe to be better controlled. The following roller assembly provides an enclosed frame 476 having an upper retrieval loop 478 and a lower clevis loop 472 locked in place by a removable pin 474. A door 482 in the frame, carried by a fixed hinge pin 480, allows the frame to be opened and the pipe 60 inserted. The door is locked in the closed position by the removable pin 474. A roller R14 is supported by an axle carried by the frame.

A cable pulley 460 is carried near the bottom 406 of the forward portion 428 of the pipe feed chute by a support 462.

Referring to FIG. 1, a winch 450 carries a compound steel cable 452 joined into a single cable by a clip 454. A first cable portion is attached at one end to the clevis 472 of the following roller assembly 470. A second cable portion extends from the winch. The two portions are joined at clip connector 454.

To use the pipeline trenching and laying device of the invention, a pipeline is laid on the ground directly above the location it is to be buried. A portion of the pipe is positioned on the tractor supported portion 100. The articulating support bracket 132 is opened, and then closed about the pipe. The pipe is then positioned on the rollers in the pipe feed chute 400. The following roller assembly 470 is attached to the pipe by passing the pipe through door 480. The winch is adjusted to provide the appropriate tension to curve the pipe. The tractor is moved forward, causing the ripper 300 to cut a trench. The forward portion of the pipe feed chute follows the ripper into the trench, while the rearward portion of the pipe feed chute pivots slightly with respect to the forward portion about articulating joint 420. The pipe passes along the rollers and out the open bottom 408 of the pipe feed chute 400. As the trench is finished, the ripper cuts a progressively shallower trench, causing the forward portion of the pipe feed chute to pivot slightly upwardly about the articulating joint 420 with respect to the rearward portion of the pipe feed chute.

The previously described versions of the present invention have many advantages, including a primary advantage of providing a novel pipeline trenching and laying device that provides a pipe feed chute that minimizes the width of the trench produced, thereby speeding the process, reducing the amount of ground required and minimizing the power required to plow the trench.

Another advantage of the present invention is to provide a novel pipeline trenching and laying device that carefully controls the curvature of the pipe as it is laid, thereby protecting the pipe from damage.

A still further advantage of the present invention is to provide a novel pipeline trenching and laying device that provides an articulated pipe feed chute that adjusts to accommodate changes in the elevation of the ground as well as changes in the elevation of the trench, particularly as the trench is first started, and its full depth is not yet achieved.

Although the present invention has been described in considerable detail and with reference to certain preferred versions, other versions are possible. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A pipeline trenching and laying device, for attachment to a tractor, comprising:
   (A) a tractor supported portion, comprising:
      (a) a rail base, attachable to an upper portion of the tractor; and
      (b) a plurality of roller assemblies, carried by the rail base;
   (B) a ripper, attached to the tractor by a rigid fixed connection; and
   (C) a pipe feed chute, attached to the ripper by an adjustable tow assembly, the pipe feed chute comprising:
      (a) parallel planar sidewalls, joined by a bottom portion, an upper portion of each sidewall supporting an angle iron rail;
      (b) a triangular nose, attached to the parallel planar sidewalls and attached to the ripper by a tow assembly;
      (c) an articulating joint, comprising overlapping panels carried by the sidewalls and hinge means, carried by the bottom portion, for allowing a forward portion of the pipe feed chute to pivot with respect to a rearward portion of the pipe feed chute;
      (d) a front guide roller assembly, carried by the parallel planar sidewalls;
      (e) a following roller assembly, comprising a frame body supporting a roller; and
      (f) a winch, carried by the parallel planar sidewalls, having a cable attached to the following roller assembly.

2. The pipeline trenching and laying device of claim 1, further comprising at least one chute buckle, attached to each of the parallel planar sidewalls.

3. The pipeline trenching and laying device of claim 1, wherein the triangular nose additionally comprises at least one stiffener plate and a forwardly directed ear defining an attachment opening.

4. A pipeline trenching and laying device, for attachment to a tractor, comprising:
   (A) a tractor supported portion, comprising:
      (a) a rail base, attachable to an upper portion of the tractor; and
      (b) a plurality of roller assemblies, carried by the rail base;
   (B) a ripper, attached to the tractor by a rigid fixed connection; and
   (C) a pipe feed chute, attached to the ripper by an adjustable tow assembly, comprising:

(a) parallel planar sidewalls, joined by a bottom portion, an upper portion of each sidewall supporting an angle iron rail;
(b) at least one chute buckle, attached to an upper portion of each of the parallel planar sidewalls;
(c) a triangular nose, attached to the parallel planar sidewalls, the triangular nose carrying at least one stiffener plate and a forwardly directed ear defining an attachment opening, the attachment opening carrying towing assembly means for towing the pipe feed chute behind the ripper;
(d) an articulating joint, comprising overlapping panels carried by the sidewalls and hinge means, carried by the bottom portion, for allowing a forward portion of the pipe feed chute to pivot with respect to a rearward portion of the pipe feed chute;
(e) a front guide roller assembly, carried by the parallel planar sidewalls;
(f) a following roller assembly, comprising a frame body supporting a roller; and
(g) a winch, carried by the parallel planar sidewalls, having a cable attached to the following roller assembly.

* * * * *